United States Patent [19]

Kubina et al.

[11] Patent Number: 5,553,912
[45] Date of Patent: Sep. 10, 1996

[54] FLUID CONTAINMENT DEVICE

[75] Inventors: Joseph E. Kubina, Oxford; Mark E. Gleason, Farmington Hills; Jerry F. Loughlin, Jr., Lake Orion; Todd H. Wludyka, Walled Lake; Thomas C. Odette, Bloomfield Hills; Craig S. Montie, Wixom; Richard F. Biermacher, West Bloomfield; Patrick M. Harney, Rochester Hills; Alfredo N. DiMichele, Warren, all of Mich.

[73] Assignee: Chrysler Corporation, Highland Park, Mich.

[21] Appl. No.: 330,942

[22] Filed: Oct. 28, 1994

Related U.S. Application Data

[63] Continuation-in-part of Ser. No. 130,481, Oct. 1, 1993, abandoned.

[51] Int. Cl.[6] ................................................. B62D 25/08
[52] U.S. Cl. .......................... 296/192; 296/208; 296/91
[58] Field of Search ............................ 296/91, 192, 208; 454/146–148; 15/250.001, 250.16

[56] References Cited

U.S. PATENT DOCUMENTS

| | | | |
|---|---|---|---|
| 2,184,798 | 12/1939 | Gracey | 296/91 |
| 2,184,995 | 12/1939 | Eriksen | 296/91 |
| 2,243,029 | 5/1941 | Cupit | 296/91 |
| 3,255,685 | 6/1966 | Hitzelberger | 454/146 |
| 4,772,066 | 9/1988 | Leschke et al. | 296/208 |
| 5,094,497 | 3/1992 | Hartung et al. | 296/91 |
| 5,101,531 | 4/1992 | Edwards et al. | 15/250.19 |

FOREIGN PATENT DOCUMENTS

| | | | |
|---|---|---|---|
| 1736808 | 5/1992 | U.S.S.R. | 296/192 |

*Primary Examiner*—Dennis H. Pedder
*Attorney, Agent, or Firm*—Thomas G. Pasternak

[57] ABSTRACT

There is disclosed herein a fluid containment device secured to, or integrated within a vehicle cowl or louvered panel serving to divert water or windshield washer fluid "run-up" away from the operator's line of vision. Such run-up of fluid tends to occur in the vicinity of the ends of a wiper blade at the end of its final or intermittent downward stroke. The fluid containment device is formed to include a ramped lead-in front surface and a vertically oriented trailing surface, creating a high pressure, low velocity space adjacent the rear surface thereof, causing a turbulent airflow to circle downwardly and spiral laterally. The result is to urge the fluid downward toward the base of the louvered panel, and laterally toward the outboard sides of the windshield.

13 Claims, 5 Drawing Sheets

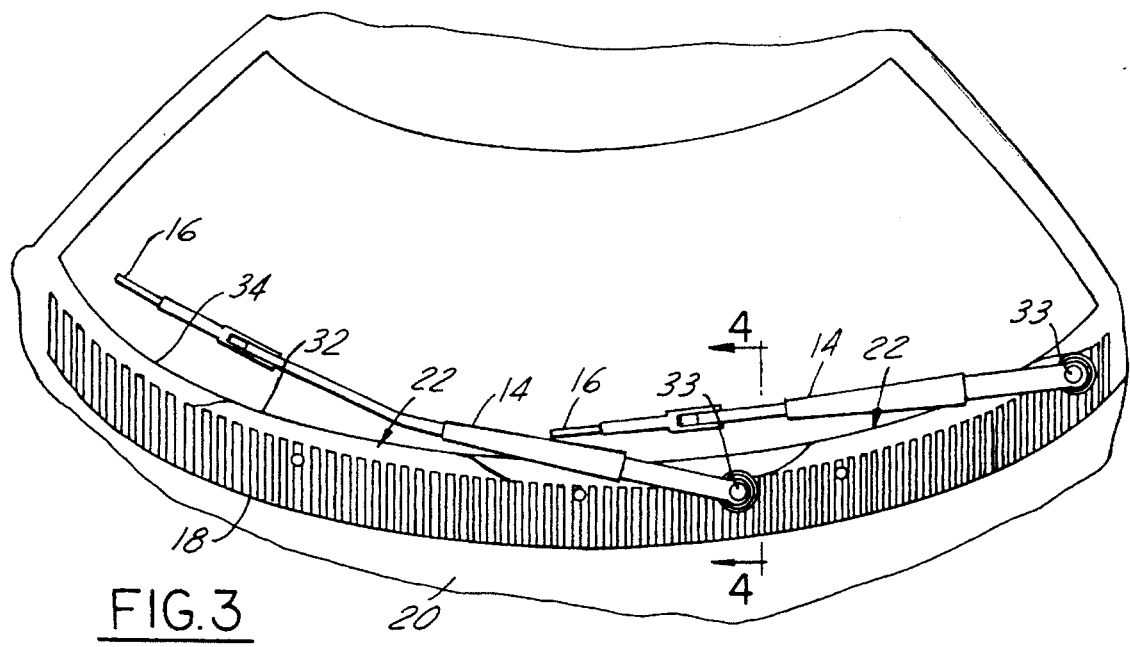
FIG.3
FIG.4A
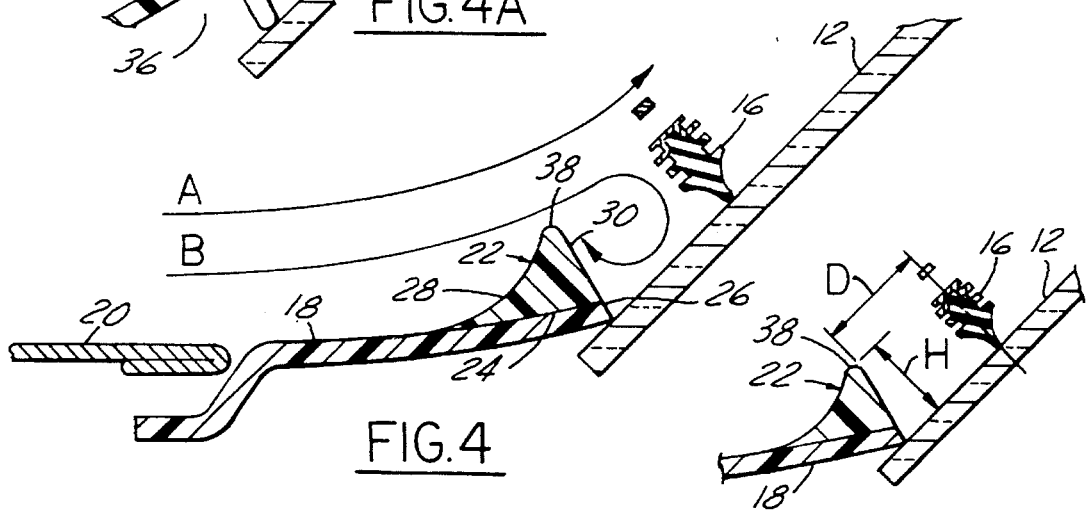
FIG.4
FIG.6
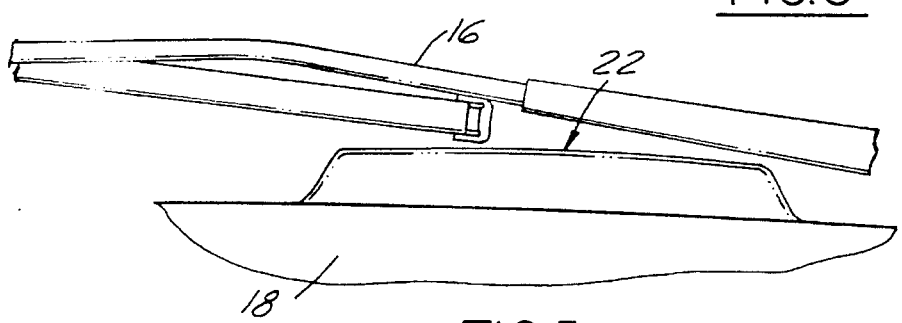
FIG.5

5,553,912

FLUID CONTAINMENT DEVICE

This application is a continuation-in-part application of Ser. No. 08/130,481, filed Oct. 1, 1993, now abandoned.

TECHNICAL FIELD

This invention relates generally to windshield wiper systems and, more particularly, to a fluid containment device associated therewith.

BACKGROUND ART

While various types of deflectors associated with vehicle windshields are known, none are known to be related to the containment of rain water and washer fluid vertical "run-up" along the windshield occurring after a final or intermittent wiper action stroke, and to directing such fluids to the outboard sides of the windshield, out of the line of vision of the operator and a front seat passenger.

For example, Cupit U.S. Pat. No. 2,243,029 discloses deflectors 4 formed of sheet metal which is slightly curved in cross-section upwardly to a forwardly directed upper edge, and fastened between adjacent cowl and hood edges, serving to divert air currents, insects and other objects upwardly over the top of the vehicle.

Gracey U.S. Pat. No. 2,184,798 discloses an upwardly-rearwardly inclined deflector mounted between the hood and the cowl for deflecting air streams over the top of the vehicle.

Eriksen U.S. Pat. No. 2,184,995 discloses a rubber deflector mounted on the vehicle hood, and having a loft or pitch on its front face for deflecting bugs and other flying objects up and over the top of the vehicle.

Hartung et al U.S. Pat. No. 5,094,497 discloses a vertical wall connected by an integral channel to a rear edge of the hood for directing bugs, water, debris and air away from and over the windshield.

Edwards et al U.S. Pat. No. 5,101,531 discloses a park ramp for a wiper, the ramp being secured to the rear edge of a cowl panel, and serving to receive and hold a stopped or "parked" wiper to prevent the blade thereof from taking a set over time.

Leschke et al U.S. Pat. No. 4,772,066 discloses a substantially U-cross-sectional shaped water diversion device secured to a vehicle A-column, and a foil-like diaphragm mounted by webs at an acute angle to the windscreen, such that the higher end thereof extends into the open side of the U-shaped device, serving to draw off dirty water and direct same to the roof of the motor vehicle and prevent it from spraying onto the vehicle side windows.

Hitzelberger U.S. Pat. No. 3,255,685 discloses a ventilation installation including a sealing ledge member or strip mounted between the rear edge of a front outer body part and a windshield. The ledge member includes provisions for both being lifted from and/or pressed against the windshield for selectively supplying air to or removing air from the interior space of motor vehicles.

USSR patent No. 1736808 discloses a transverse aerodynamic element between the rear edge of the vehicle's bonnet and the lower transverse frame of the windshield. On the latter side, the element includes vertical and inclined walls forming a crosswise extending recess with drainage holes.

DISCLOSURE OF THE INVENTION

A general object of the invention is to provide a fixed, compact, economical and efficient fluid containment device on a vehicle cowl or louvered panel adaptable for diverting fluid "run-up" on the windshield during operation of the windshield wiper, away from the respective lines of vision of the operator and a front seat passenger. The more sloped the windshield, with respect to vertical, the more prevalent the, so-called, "run-up."

Another object of the invention is to provide a fluid containment device on the rear edge portion of a vehicle louvered panel for diverting rain water and washer fluid sidewardly, rather than permitting portions of such fluids to flow upwardly on the windshield in the vicinity of the ends of the wiper blades.

A further object of the invention is to provide a fluid containment device secured to, or integrated within, a portion of the rear edge of a vehicle louvered panel and having a cross-section with a ramped lead-in front surface.

Still another object of the invention is to provide such a fluid containment device which is permanently positioned against the windshield adjacent the wiper blade thereon when the blade is in its down position, providing a high pressure, low velocity space for attracting a vortex of air flow behind the device to divert the fluids downwardly, then laterally, from the blade to the outboard sides of the windshield.

These and other objects and advantages will become more apparent when reference is made to the following drawings and the accompanying description.

BRIEF DESCRIPTION OF THE DRAWINGS

FIG. 3 is an enlarged fragmentary front view of a portion of FIG. 2;

FIG. 4 is an enlarged cross-sectional view taken along the plane of the line 4—4 of FIG. 3, and looking in the direction of the arrows;

FIG. 4A is a fragmentary cross-sectional view of a portion of the FIG. 4 structure, showing an alternate embodiment thereof;

FIG. 5 is an enlarged fragmentary front view of a portion of the FIG. 3 structures;

FIG. 6 is a fragmentary portion of the FIG. 4 structure illustrating an operative characteristic of the invention;

FIG. 14 is a view taken in the direction of the arrow in FIG. 10.

BEST MODE OF CARRYING OUT THE INVENTION

Figure 1:
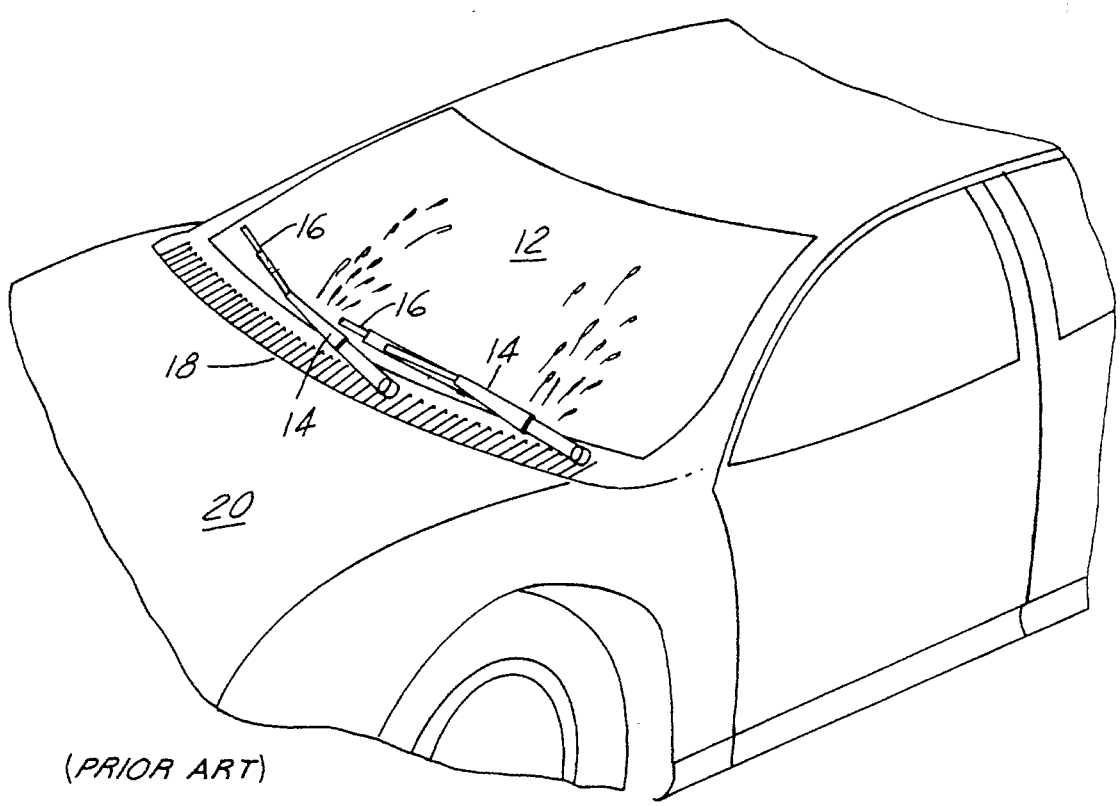
FIG. 1 is a fragmentary perspective view of a vehicle embodying the prior art windshield wiper system.

Referring now to the drawings in greater detail, FIG. 1 illustrates the typical prior art arrangement, including a vehicle 10 having the usual windshield 12 and dual wiper arms 14 and blades 16 reciprocally pivotally mounted on the cowl or louvered panel 18 or rear edge of the vehicle hood 20. There is illustrated a typical phenomenon of water "run-up" along the windshield 12 originating in the vicinity of the ends of each blade 16 after the final or any intermittent wipe of the latter during rain and washer fluid use conditions. The location of the run-up is such that it invades the forward lines of vision of both the driver and a front seat passenger.

Figure 2:
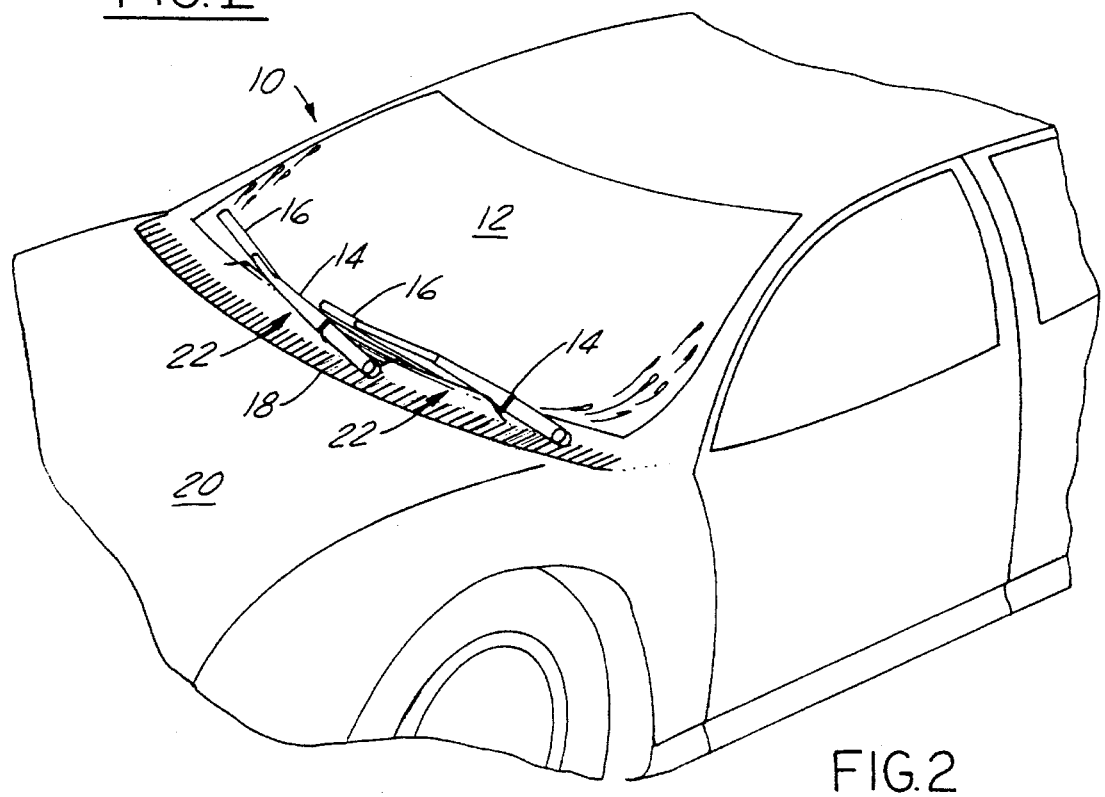
FIG. 2 is a fragmentary perspective view of a vehicle including a windshield, so-called, parallel blade wiper system and the associated inventive fluid containment device.

FIG. 2 illustrates a "run-off" of water adjacent the left end of the windshield 12, viewed from the inside, when a cowl fluid containment device, represented as 22 and as shown in FIGS. 3–6, is used. As indicated by its name, the cowl fluid containment device 22 is mounted with its bottom surface 24 secured to, or integrated within, the cowl 18, and specifically along the trailing edge portion 26 of the latter.

As shown in FIG. 4, the fluid containment device 22 may be formed of a suitable plastic material to include in cross-section a ramped leading surface 28, with a space 30 therebehind, forming a body 32 (FIG. 3), wherein the length of the body 32 generally has an arcuate shape conforming to the shape of the trailing edge 34 of the louvered panel 18. The ramped leading surface 28 may consist of a straight sloped or concave-shaped surface. The respective ends of the wiper blades 16 closer to the pivot points 33 (FIG. 3), when the blade is in its down position, are positioned adjacent middle portions of the length of the respective devices 22. The particular shape of the back side of the body 32 is not a factor.

FIG. 4A illustrates that the device 22 may include a hollowed-out portion 36.

During operation, airflow is represented by the arrows A and B in FIG. 4. As indicated by the arrow B, the air flowing rearwardly adjacent the louvered panel 18 and the ramped surface 28 of the device 22, due to a typically high pressure/low velocity vortex in the space 30, tends to curl downwardly and spiral laterally after passing the top edge 38 of the device. As such, any water or fluid wiped downwardly by the blade 16 on a final or intermittent return stroke prior to the wiper assembly 14/16 being stopped, is caused to be pulled downwardly and to travel along the length of the space 30 behind the surface 28, toward the outboard end of the windshield 12 of the driver's side, to be dispersed at an angle, as shown in FIG. 2, rather than running directly upwardly into the operator's line of vision, as shown in FIG. 1. The longer the device 22 toward the outer portion of the windshield on the driver's side, the less the interference with the line of vision.

Referring now to FIG. 6, D represents the distance along the windshield 12 between the upper edge 38 of the fluid containment device 22 and the tip of the wiper blade 16. H represents the height of the top edge 38 above the surface of the windshield 12. The ratio of H/D is important and may vary somewhat for different model vehicles. Specifically, for the PL (Neon) vehicle model, it is preferred that the ratio H/D be greater than 0.530.

On the front seat passenger side, any run-up which may occur at the outer end of the device 22 is intercepted by the adjacent parked wiper blade 16, to thereafter follow the blade to its outer edge, out of the line of vision of the passenger.

Figure 7:
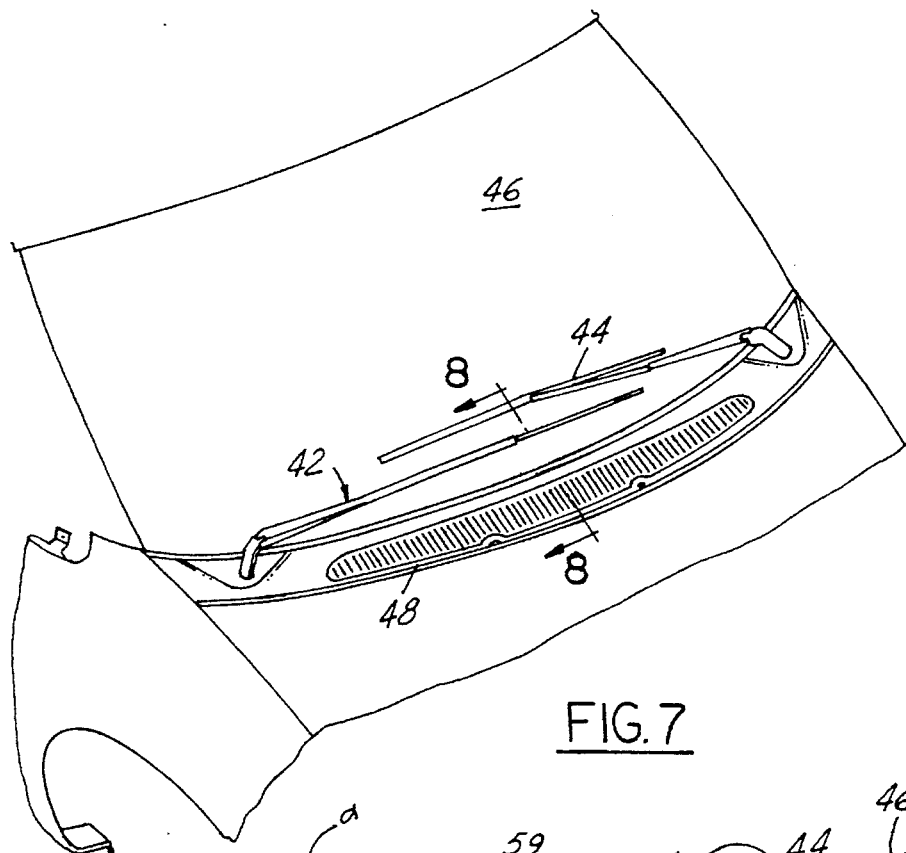
FIG. 7 is a fragmentary perspective view of a vehicle including a windshield opposing arm wiper system and the associated inventive fluid containment devices.
Figure 8:
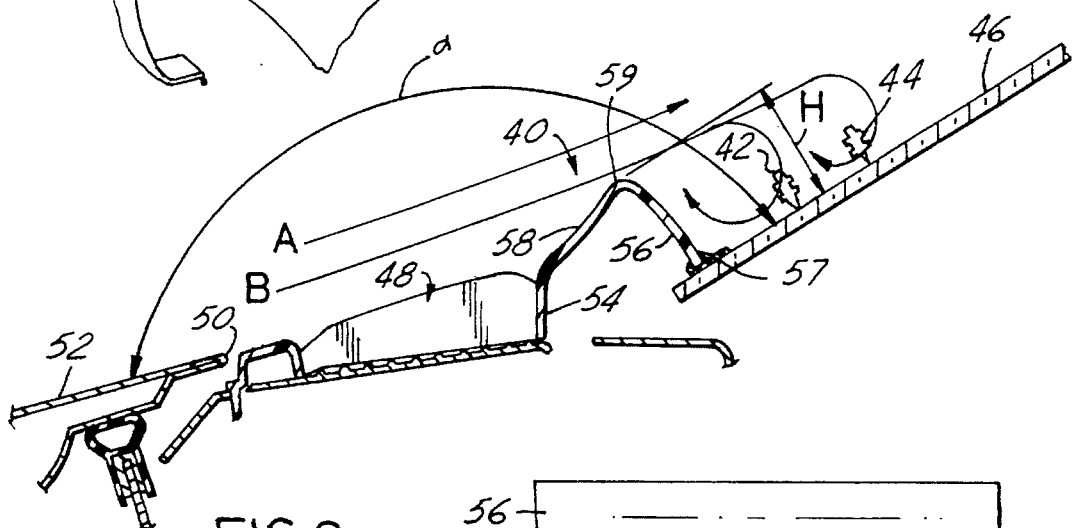
FIG. 8 is an enlarged cross-sectional view taken along the plane of the line 8—8 of FIG. 7, and looking in the direction of the arrows.
Figure 9:
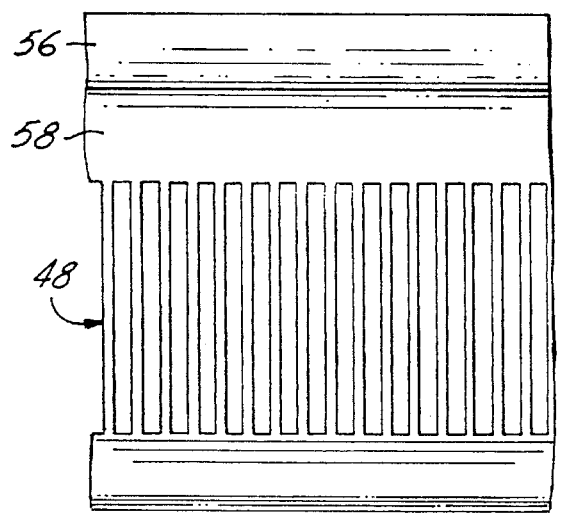
FIG. 9 is an enlarged fragmentary plan view of a portion of the FIG. 7 structure.

Referring now to FIGS. 7–9, an alternate rigid fluid containment device 40 is adaptable for use with two windshield wiper assemblies 42 and 44 mounted for reciprocal movement adjacent oppositely disposed ends of the windshield 46. The device 40 is formed as an extension of a molded plastic cowl or louvered panel 48 adjacent the rear end 50 of a hood 52. Specifically, the device 40 is a substantially inverted U-shaped member, including a front leg 54 secured to the rear of the louvered panel 48, a rear leg 56 having a seal 57 secured to the end thereof and seated on the windshield 46, with a ramped intermediate segment 58 tapering upwardly from the front leg to the rear leg.

It is noted in FIG. 8 that the windshield 46 is positioned at a shallower slope relative to the slope of the hood 52 than is the case for the steeper windshield 12 of FIG. 4 relative to the hood 20. As such, the height H of the fluid containment device 40 from the windshield 46 to the juncture 59 of the rear leg 56 and the ramped segment 58 is important, and has been determined to be 41 mm for the NS (mini van) vehicle model, where the included angle $\alpha$ between the windshield 46 and the hood 52 is on the order of 164.5°. The resultant high pressure, low velocity vortex adjacent the rear leg 56 serves to cause fluid to be pulled downwardly and to travel laterally to the outboard edge of the windshield (FIG. 7).

The effective height H may be decreased for smaller included angles, since fluid run-up therefor is progressively less for windshield angles closer to vertical.

Figure 10:
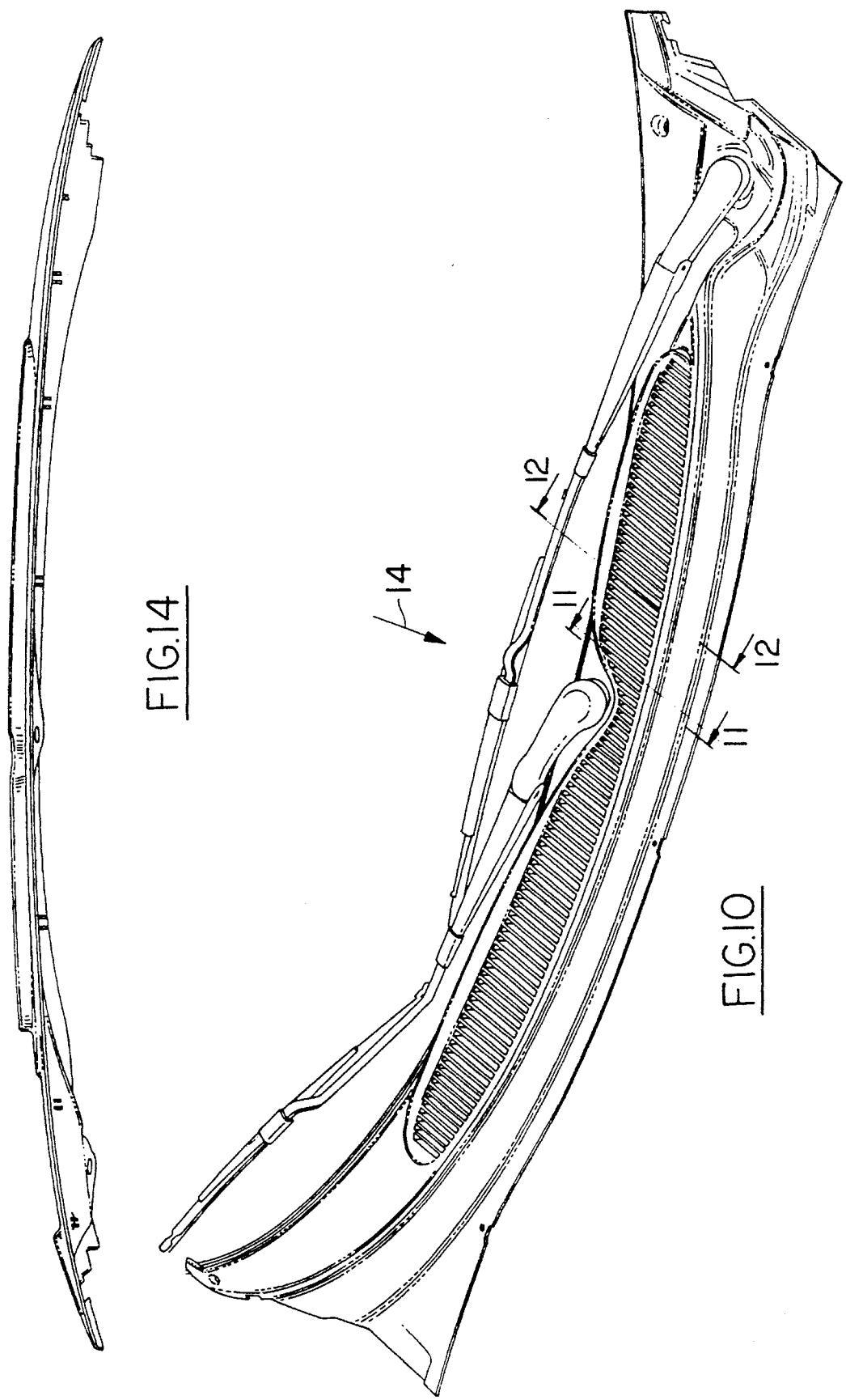
FIG. 10 is a fragmentary perspective view of a vehicle including a windshield parallel blade wiper system and an alternate fluid containment device.
Figure 11:
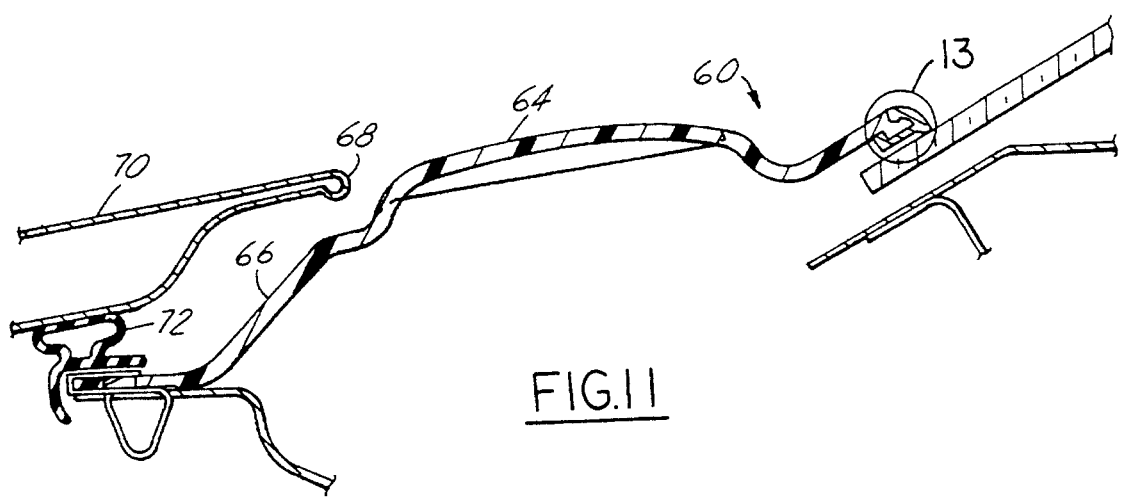
FIGS. 11 and 12 are cross-sectional views taken along the planes of the lines 11—11 and 12—12 of FIG. 10, and looking n the directions of the respective arrows.
Figure 12:
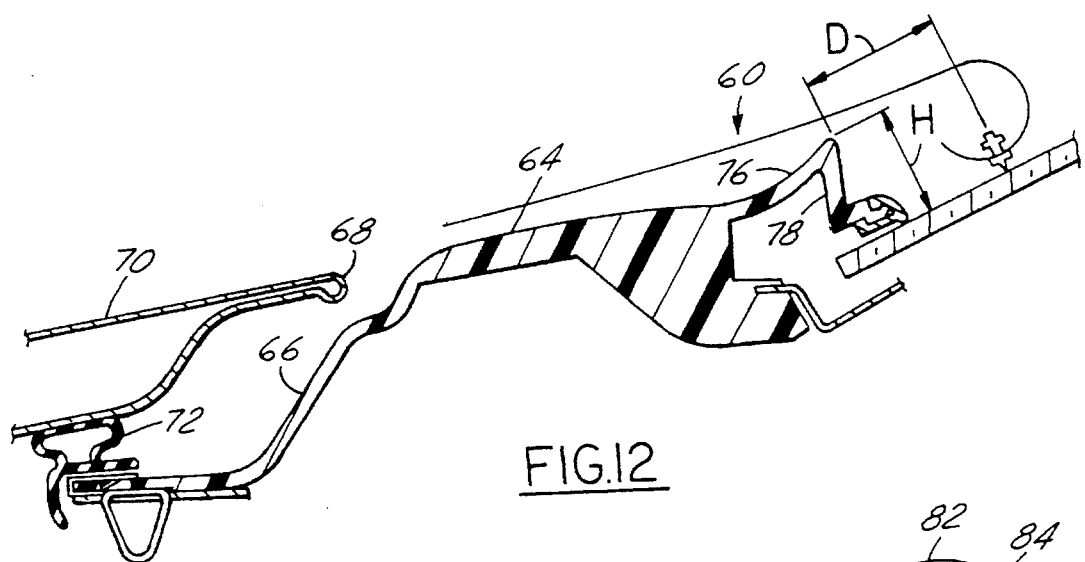
Figure 13:
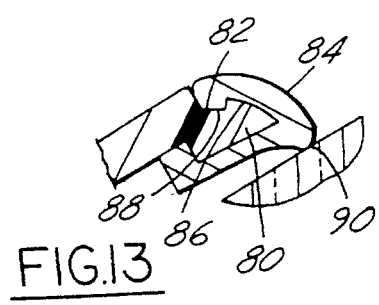
FIG. 13 is an enlarged fragmentary portion of the FIGS. 11 and 12 structures.

Referring now to FIGS. 10–14, a further alternate rigid fluid containment device 60 is adaptable for use with windshield wiper assemblies 62 and 63. As shown in FIGS. 11 and 12, the device 60 is integral with a cowl or louvered panel 64 having a forward portion 66 extending beneath the rear edge 68 of a hood 70, with a seal 72 mounted between an inner wall 74 of the hood 70 and the distal end of the forward portion 66. The device 60 forms the trailing portion of the louvered panel 64, and includes a ramped surface 76 (FIG. 12) similar to the concave-shaped leading surface 28 of FIG. 4. A rear wall 78 is substantially vertical, with a foot-like extension 80 formed on the distal end thereof. A lateral recess 82 is formed in the upper surface of the extension 80 (FIG. 13). A rubber 84 is shaped to include a channel 86 having an in-turned flange 88 thereon for fitting around the distal end of the extension 80 and in the recess 82. A terminal end 90 is formed on the seal 84 for permanently abutting against the windshield 92 (FIG. 10).

The effect adjacent the rear wall 78 and the windshield 92 is similar to that described above relative to the FIGS. 2–5 structure.

In addition to the described effect due to the vortex action on any fluid in that area, because air is deflected over the wiper assemblies 14/16 (FIGS. 2 and 3), the wiper assemblies 42 and 44 (FIG. 7), and the wiper assemblies 62 and 63 (FIG. 10), the resultant decrease in velocity of air going through each structure, serves to reduce wind noise therethrough.

INDUSTRIAL APPLICABILITY

It should be apparent that the invention provides a compact, economical and efficient means for diverting the run-up of rain water and windshield washer fluid, which is known to occur around the ends of a windshield wiper blade after completing a final or intermittent stroke, from a location on the windshield in the operator's or front seat passenger's line of vision to a non-interfering location.

It should be further apparent that the fluid containment device may consist of two separate segments (FIG. 2), one long segment (FIG. 7), or two interconnected segments (FIG. 10), and is applicable to, so-called, parallel wiper assemblies (FIGS. 2 and 10), and to oppositely mounted wiper assemblies (FIG. 7).

While but three embodiments of the invention have been shown and described, other modifications thereof are possible within the scope of the following claims.

What is claimed is:

1. A fluid containment device operable between a vehicle's louvered panel trailing edge portion, and an individual wiper blade to divert rain water or washer fluid toward the outboard sides of the vehicle's windshield during a final or intermittent stroke of the wiper blade, said device comprising a rigid body mounted along the trailing edge portion of said louvered panel adjacent the wiper blade in its down position, said rigid body having a ramped leading portion and a substantially vertically oriented trailing portion, said leading portion and said trailing portion joined at their adjacent edges to form an upper edge positioned substantially directly above a leading edge of the windshield, and having a terminal end portion formed on the substantially vertically oriented trailing portion permanently abutted against said windshield.

2. The fluid containment device described in claim 1, wherein said ramped leading portion is one of a straight sloped or concave-shaped surface.

3. The fluid containment device described in claim 1, wherein the ratio of the height of the upper edge of the ramped portion above the windshield surface and the distance between the upper edge and a center line of a cross section of said wiper blade is greater than 0.530.

4. The fluid containment device described in claim 1, wherein said rigid body results in a high pressure, low velocity air flow condition adjacent said vertically oriented trailing portion whereby airflow over the top of said ramped leading portion curls downwardly toward the windshield and spirals laterally so as to cause fluids to follow the space behind the fluid containment device to the outboard ends of the windshield.

5. A fluid containment device operable between a vehicle's louvered panel trailing edge portion, and an individual wiper blade to divert rain water or washer fluid sidewardly on the vehicle's windshield during a final or intermittent stroke of the wiper blade, said device comprising a rigid body operatively included along the trailing edge portion of said louvered panel adjacent the wiper blade in its down position, said rigid body having a ramped leading portion and a substantially vertically oriented trailing portion positioned substantially directly above and extending downwardly to an end portion permanently abutted against the windshield, wherein the height of said rigid body is proportional to the included angle between the windshield and a vehicle hood.

6. The fluid containment device described in claim 5, wherein said rigid body is integrated within the trailing edge portion of said louvered panel.

7. The fluid containment device described in claim 5, and a seal secured to said rigid body at said vertically oriented trailing portion against said windshield.

8. The fluid containment device described in claim 5, and a second rigid body for use with dual windshield wiper assemblies.

9. The fluid containment device described in claim 8, wherein said device includes a segment adjacent each windshield wiper assembly.

10. The fluid containment device described in claim 5, wherein said device is one continuous segment extending substantially across the width of said windshield for use with dual windshield wiper assemblies.

11. The fluid containment device described in claim 8, wherein said dual windshield wiper assemblies are mounted on one side of center of the louvered panel for, so-called, parallel action.

12. The fluid containment device described in claim 5, wherein said end portion is a seal.

13. The fluid containment device described in claim 5, wherein said end portion is a foot-like extension with a rubber seal mounted thereon.

* * * * *